Aug. 28, 1962 R. KOMPFNER 3,051,911

BROADBAND CYCLOTRON WAVE PARAMETRIC AMPLIFIER

Filed Dec. 21, 1960 2 Sheets-Sheet 1

INVENTOR
R. KOMPFNER
BY David P. Kelley
ATTORNEY

BROADBAND CYCLOTRON WAVE PARAMETRIC AMPLIFIER

Filed Dec. 21, 1960 2 Sheets-Sheet 2

INVENTOR
R. KOMPFNER
BY David P. Kelley
ATTORNEY 3,051,911

BROADBAND CYCLOTRON WAVE PARAMETRIC AMPLIFIER

Rudolf Kompfner, Middletown, N.J., assignor to Bell Telephone Laboratories, Incorporated, New York, N.Y., a corporation of New York Filed Dec. 21, 1960, Ser. No. 77,323
11 Claims. (Cl. 330—43)

This invention relates to electron beam devices and more particularly to cyclotron wave parametric amplifiers.

A recent important advance in the art is the cyclotron wave parametric amplifier, known also as the quadrupole amplifier. By employing the principles of fast cyclotron wave parametric amplification, this device permits the direct removal of beam noise energy. Beam noise has heretofore been a serious drawback of electron beam amplifiers such as the klystron and traveling wave tube.

The electron gun of the aforementioned device produces a beam which flows successively through an input coupler, a quadrupole amplifying coupler, and an output coupler. The beam is immersed in a uniform magnetic field that is parallel to the path of the beam, and which establishes a cyclotron frequency at which the electrons will rotate if acted upon by forces transverse to the field.

The input coupler is a resonant circuit that is tuned to the cyclotron frequency. It serves to introduce signal frequency energy to the fast cyclotron mode of the beam and extract fast cyclotron wave signal frequency noise energy from the beam. The pump coupler is also a resonant circuit and is excited by a pump wave of twice the cyclotron frequency. The pump wave couples to the beam and amplifies the fast signal cyclotron wave on the beam. A necessary condition for amplification is the production of quadrupole electric fields throughout the beam within the pump coupler; hence, the term "quadrupole amplifier." The output coupler is identical with the input coupler and it extracts the amplified low noise signal wave from the beam.

It has become apparent that for some applications, the quadrupole amplifier has certain drawbacks which may prove to be quite serious. One of these is the requirement that the signal frequency be approximately equal to the cyclotron frequency. The cyclotron frequency is directly proportional to the magnetic field and therefore, high frequency operation requires a very high magnetic field. The heavy and bulky magnet necessary to meet these requirements may seriously limit the device's usefulness.

Although the device is described as being capable of operating over a fairly wide frequency band, even larger bandwidths of operation are often required. This is particularly true of non-degenerate operation wherein the pump frequency is not twice the signal frequency. In such cases, it is necessary to remove idler frequency beam noise in addition to signal frequency noise. The idler frequency is defined as the difference of the pump and signal frequencies.

As will be explained hereinafter, it is possible to resolve some of these problems through the use of distributed circuit couplers rather than resonant circuit couplers. A serious obstacle, however, to the use of distributed circuits is the difficulty of launching and propagating a traveling pump wave which produces the necessary quadrupole electric fields for parametric amplification.

It is an object of this invention to reduce the magnetic field requirements for high frequency cyclotron wave parametric amplification.

It is another object of this invention to increase the bandwidth of a cyclotron wave parametric amplifier.

It is another object of this invention to propagate pump waves which produce quadrupole electric fields throughout the electron beam of a distributed circuit cyclotron wave parametric amplifier.

It is one feature of this invention that the signal, pump and output couplers comprise distributed circuits. As a result, synchronism between the circuits and the beam is determined not only by the time alternating frequency of the waves, but also by the spacial periodicity, or phase constant, of the circuit. As a consequence, the cyclotron frequency may be lower than the signal frequency and the magnetic field requirement is reduced.

It is another feature of this invention that auxiliary magnetic fields be superimposed upon the mean longitudinal magnetic field in the input and output couplers in such a manner that the magnetic field at the upstream end of the couplers is larger than the mean magnetic field and the magnetic field in the downstream end of the couplers is smaller than the mean magnetic field. By this expedient, as will be apparent hereinafter, it is possible to transfer energy between the beam and the coupler over an extremely wide band of frequencies.

It is a feature of one embodiment of this invention that the magnetic field in the input and output couplers be tapered fairly gradually from a maximum at the upstream end to a minimum at the downstream end. As will be more fully explained hereinafter, this tapered magnetic field produces a phase constant within the cyclotron mode of the electron beam that tapers from some high value at the upstream end of the coupler to some lower value at the downstream end. The mean magnetic field is adjusted such that, at the center of the input and output couplers the phase constant of the fast cyclotron mode is approximately equal to that of the couplers. Under these conditions, complete power transfer between the coupler and the beam can be effected over a frequency band of more than three octaves.

It is a feature of another embodiment of this invention that the magnetic field in the input and output couplers be reduced abruptly from a high value to a low value at approximately the mid-point of the couplers and that the length of each coupler be approximately equal to $$\frac{\pi}{\sqrt{2}\beta_c}$$

where $\beta_c$ is the coupling phase constant of the cyclotron mode and the coupler. This embodiment has the advantage of being capable of transferring power completely over a relatively short length. Its bandwidth capabilities are, however, generally not as great as those of the foregoing embodiment.

It is a feature of another embodiment of this invention that the pump coupler comprise a pair of parallel rods surrounded by a conductive cylinder. A traveling pump wave can conveniently be launched on this coupler by means of a conventional coaxial cable. The outer conductor of the cable is connected to the conductive cylinder of the coupler and the inner conductor of the cable is connected to the two parallel rods. As the pump wave travels along the coupler, quadrupole electric fields are produced within the electron beam.

It is a feature of another embodiment of this invention that the pump coupler comprise a balanced coaxial line having a pair of ridges on the outer conductor that taper toward the inner conductor. The inner conductor has a central aperture through which the beam flows and a pair of slots to receive gradually the two ridges. Again, the pump wave is launched by connecting the outer and inner conductors of a coaxial cable to the outer and inner conductors of the pump coupler. The ridges act with the inner conductor to produce quadrupole electric fields within the beam. The ridges are tapered in order to prevent reflection or distortion of the traveling pump wave.

These and other objects and features of this invention will be understood more clearly with reference to the following description taken in conjunction with the drawings, in which.

Figure 1:
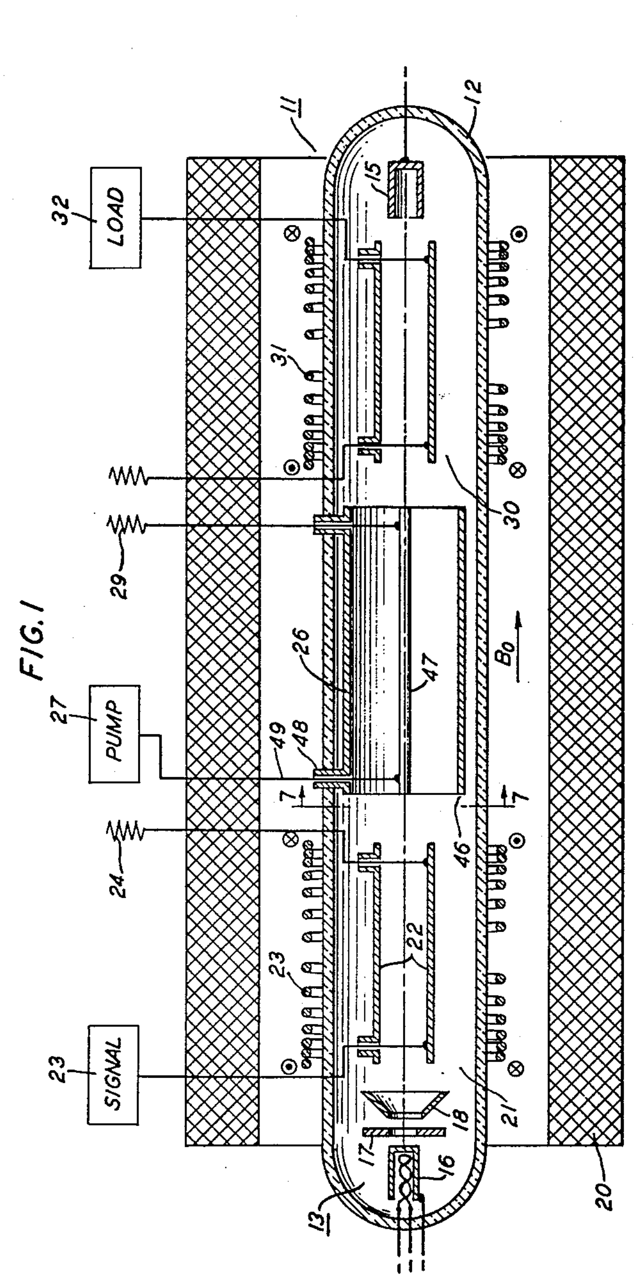
FIG. 1 is a schematic illustration, shown in cross section, of one embodiment of this invention.

Referring now to FIG. 1, there is shown a schematic illustration of an electron discharge device 11 utilizing principles of my invention. Located at opposite ends of an evacuated envelope 12 are an electron gun 13 for forming and projecting an electron beam and a collector 15 for collecting the beam. For illustrative purposes, electron gun 13 is shown as comprising a cathode 16, a focusing electrode 17, and an accelerating electrode 18. The various electrodes are biased in a known manner by a source of D.-C. voltage which, for the sake of clarity, has not been shown. Surrounding the envelope is an electromagnet 20 which focuses the electron beam through the production of a longitudinal magnetic field $B_0$ as indicated by the arrow.

Besides focusing the beam, the magnetic field $B_0$ establishes fast and slow cyclotron modes of wave propagation within the beam. Waves traveling in those modes are referred to as cyclotron waves and are generally excited by applying high frequency electric fields to the beam that are transverse to the magnetic field. The transverse forces on the electrons from such electric fields combine with the focusing forces of the magnetic field and the longitudinal kinetic energy of the beam, to cause the electrons to follow spiral paths to the collector. Neglecting space-charge forces, the radii of gyration of the electrons are proportional to the applied transverse electric fields. The phase velocity of the cyclotron wave is defined by the phase positions of successive gyrating electrons.

As will be explained more fully hereinafter, the phase velocity of a cyclotron wave is a function of its frequency, the mean (or D.-C.) velocity of the beam, and the magnetic focusing field. Waves at any given frequency can, however, travel at either of two phase velocities depending upon whether they are excited by adding energy to the beam or extracting energy from the beam. If they are excited by the addition of energy, they travel faster than the mean beam velocity and are known as fast cyclotron waves; if not, they travel slower than the beam and are called slow cyclotron waves.

Referring again to FIG. 1, there is shown, adjacent electron gun 13, an input coupler 21 comprising a "strip line" waveguide 22. Waveguide 22 consists of a pair of parallel plates and is connected to a source 23 of signal frequency energy. Signal frequency energy therefore propagates along the waveguide 22 toward the right (in the direction of beam flow) at substantially the velocity of light. The magnetic field $B_0$ is of a predetermined value, with respect to the mean beam velocity, to give a cyclotron wave phase velocity at the signal frequency that approximates the velocity of light. Because of approximate velocity synchronism, and because the electric fields produced in waveguide 22 are transverse to the magnetic field, energy from source 23 is capable of coupling with the fast cyclotron mode of the electron beam.

In accordance with this invention, the phase velocity of the signal frequency cyclotron wave is actually tapered from some value higher than that of light at the upstream end of waveguide 22 to some value lower than that of light at the downstream end. This is accomplished through the provision of an auxiliary coil 23 that surrounds waveguide 22 and superimposes a varying longitudinal magnetic field on the steady field $B_0$ produced by magnet 20. As will be fully explained hereinafter, this arrangement causes a wide frequency band of energy from source 23 to be completely transferred to the electron beam, whereupon it propagates as a fast cyclotron wave. Further, fast cyclotron wave noise energy within a wide signal frequency band is completely transferred to waveguide 22, whereafter it is transmitted to, and dissipated by, an impedance 24.

After being modulated in waveguide 22, the electron beam flows through a pump coupler 26, which, in accordance with my invention, is a specific form of waveguide. Pump frequency energy from a source 27 is introduced at the upstream end of coupler 26 and it propagates within the coupler at the velocity of light in the direction of beam flow. As it travels within the coupler, the pump energy couples to the signal cyclotron wave on the beam. Through the phenomenon of parametric amplification, pump wave energy is ultimately converted to signal cyclotron beam wave energy, so that the signal cyclotron wave grows and the electromagnetic pump wave decays. The residual electromagnetic pump wave is transmitted to an impedance 29 where it is dissipated.

Downstream from the pump coupler is an output coupler 30 that is substantially identical to input coupler 21. Surrounding the output coupler is an auxiliary coil 31 that produces a varying longitudinal magnetic field within the coupler. By this arrangement, the amplified signal cyclotron wave energy is completely converted to electromagnetic wave energy, is transferred to wave guide 30, and is transmitted to an appropriate load 32.

Figure 2:
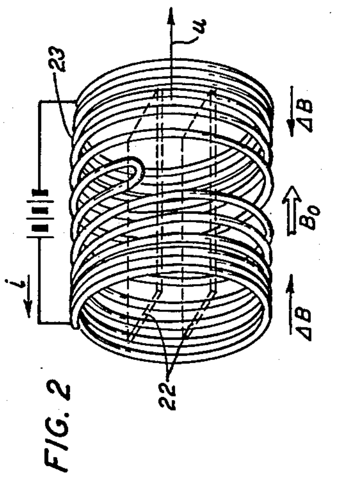
FIG. 2 is a perspective view of the input or output coupler and its associated field coils of FIG. 1.

FIG. 2 shows in perspective the auxiliary coil 23 of FIG. 1. At the upstream end, current flow through the coil is clockwise to produce a magnetic field $\Delta B$ in the direction of the steady focusing field $B_0$. The pitch of the winding then tapers toward the downstream end so that $\Delta B$ decreases with distance. At the middle of waveguide 22, the winding changes direction so that the current commences flow in a counterclockwise direction. The pitch of the winding increases at the same rate as the foregoing decrease, so that the spatially varying flux density $\Delta B$ reverses direction.

Figure 3:
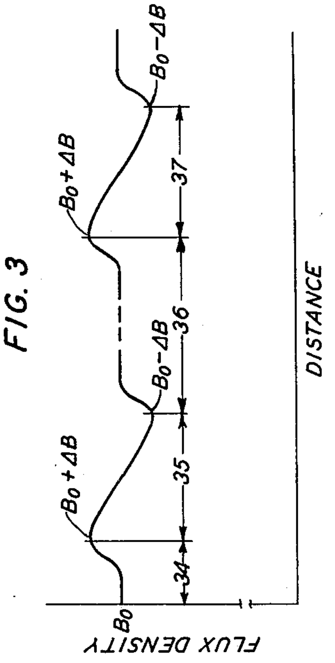
FIG. 3 is a graph of the magnetic flux density vs. distance in the beam of the device of FIG. 1.

The superimposition of field $\Delta B$ on the focusing field $B_0$ is illustrated on the graph of FIG. 3. For reference purposes, distance 34 is the region between cathode 16 and input coupler 21, distance 35 is the region within the input coupler, distance 36 is the region between the input coupler and output coupler 30, and distance 37 is the region within the output coupler. As can be surmised from the graph, coil 31 of output coupler 30 is identical in structure and function to coil 23.

The reason for superimposing magnetic field $\Delta B$ to vary the magnetic flux in regions 35 and 37 is to vary the phase constant of the cyclotron mode of the beam in these regions. It can be shown that the phase constant $\beta_f$ of a fast cyclotron wave is:

$$\beta_f = \frac{\omega - B\eta}{u} \qquad (1)$$

where $\omega$ is the frequency of the cyclotron wave, B is the magnetic flux density threading the beam, $\eta$ is the chargeto-mass ratio of an electron, and $u$ is the D.-C. beam velocity. As can be seen from Equation 1, the phase constant of a cyclotron wave is a function of the magnetic flux density.

In the illustrative embodiment of FIG. 1, the phase constant $\beta_w$ of the uncoupled signal wave traveling on the input and output couplers is:

$$\beta_w=\frac{\omega_s}{v_s}=\frac{\omega_s}{c} \quad (2)$$

where $\omega_s$ is the signal frequency, $v_s$ is the velocity of the uncoupled electromagnetic signal wave, which, in this embodiment, is equal to $c$, the velocity of light. The mean flux density $B_0$ is, therefore, determined by Equations 1 and 2:

$$\frac{\omega_s-B_0\eta}{u}=\frac{\omega_s}{c} \quad (3)$$

From the foregoing, one can see that at the midpoint of couplers 21 and 30, the magnetic field is equal to $B_0$ and the phase constants of the signal cyclotron mode and the coupler circuit are equal ($\beta_f=\beta_w$); at the upstream end of the couplers, the magnetic field is higher than $B_0$ and the phase constant of the cyclotron mode is lower than that of the coupler circuit ($\beta_f<\beta_w$); at the downstream end, the cyclotron mode phase constant is higher than the circuit phase constant ($\beta_f>\beta_w$). As mentioned previously, a coupler constructed according to these specifications is capable of transferring a very wide band of signal frequency energy to the beam and extracting a correspondingly wide frequency band of cyclotron wave noise energy from the beam. These results can be proven mathematically, but, for the present purpose, it is perhaps more appropriate that a mechanical analogy be presented.

Figure 4:
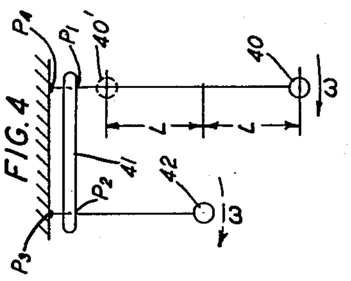
FIG. 4 is a coupled pendulum system which illustrates the principle of operation of the coupler in FIG. 2.

FIG. 4 shows a simple coupled system comprising a first pendulum 40 coupled by a rigid coupling rod 41 to a second pendulum 42. Pendulum 40 has a pivot point $P_1$ on coupling bar 41 and pendulum 42 has a pivot point $P_2$ on the coupling bar. The coupling bar, in turn, pivots about pivot points $P_3$ and $P_4$. By this arrangement, it can be seen that if only one of the pendulums is excited, both of them will oscillate to some extent due to the coupling therebetween.

The length of the two pendulums is analogous to the phase constants of two coupled transmission lines. Assume that pendulum 40, which is initially a length L longer than pendulum 42, is excited to oscillate at a frequency $\omega$. During oscillation, pendulum 40 is then gradually shortened to position 40', a length L shorter than pendulum 42. It can be shown that during this transition the kinetic energy on pendulum 40 is gradually transferred to pendulum 42, and by the time pendulum 40 reaches position 40' all of its energy will have been transferred to pendulum 42. Likewise, if pendulum 42 is initially excited, all of its energy will be transferred to pendulum 40 during the same process. Further, the transfer can take place over very wide frequency band, so that complete energy interchange will take place between the two pendulums even if they are excited at different frequencies having different amplitudes. Pendulum 40 is analogous to the cyclotron mode of the beam of the device of FIG. 1 which has a varying phase constant and pendulum 42 is analogous to the waveguide 22, which has an unvarying phase constant.

From the above considerations, it can intuitively be appreciated that the change of phase constant must necessarily be made over a span of several wavelengths of operating frequency; this is true both of the pendulum system and the cyclotron mode coupling system. For a theoretical 100 percent transfer, both the change of phase constant and the length of the coupler should be infinite. In practice, $\Delta B$ need only be a small fraction of $B_0$ and the coupler usually need only be five to fifteen wavelengths long.

Figure 5:
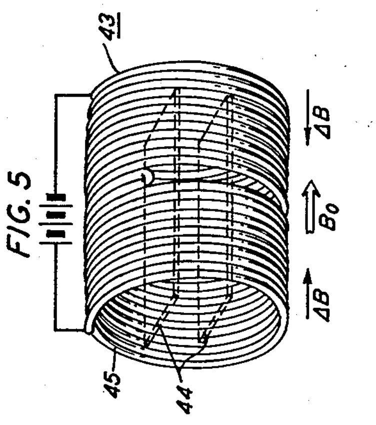
FIG. 5 is a perspective view of an input or output coupler and its associated field coils that could alternatively be used for the input or output coupler of FIG. 1.
Figure 6:
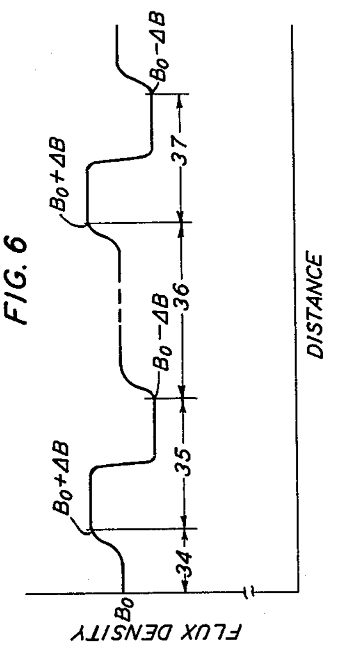
FIG. 6 is a graph of flux density vs. distance in an electron beam of a device of the type shown in FIG. 1 utilizing input and output couplers of the type shown in FIG. 5.

It is apparent, however, that the coupler of FIG. 2 would have to be undesirably long if operated at microwave frequencies having wavelengths in the decimeter region. Another type of coupler that could be substituted for the input and output couplers of FIG. 1 is shown in FIG. 5. Coupler 43 comprises a waveguide 44 surrounded by a winding 45 that abruptly changes direction at the midpoint of the coupler. A magnetic field $\Delta B$ is thereby superimposed on focusing field $B_0$, that is of substantially uniform magnitude but which reverses direction at the coupler midpoint. The magnetic field produced in coupler 43 is illustrated by the graph of FIG. 6, which is similar to the graph of FIG. 3. The advantage of coupler 43 is its short length requirements. Unlike the coupler of FIG. 2, coupler 43 is of a specific length which may be quite short even at relatively low frequencies.

It can be shown that the optimum value of $\Delta B$ of the coupler of FIG. 5 is:

$$\Delta B=\frac{B_0u}{\sqrt{2}\omega D}\sqrt{\frac{I_0Z_0}{4V_0}} \quad (4)$$

where $\omega$ is the mean signal frequency, D is the distance between the two plates of the waveguide, $I_0$ is the D.-C. current of the electron beam, $Z_0$ is the impedance of the waveguide, and $V_0$ is the D.-C. voltage of the beam. A more general equation of $\Delta B$ can be shown to be:

$$\Delta B=\frac{uB_0\beta_d}{\omega} \quad (5)$$

where $\beta_d$ is the difference phase constant:

$$\beta_d=|\beta_1-\beta_2| \quad (6)$$

where $\beta_{1,2}$ are the phase constants of the fast signal cyclotron mode and the waveguide respectively. Inasmuch as the average phase constant of the cyclotron mode along the coupling region equals the phase constant of the waveguide:

$$\beta_d=\beta_c \quad (7)$$

where $\beta_c$ is the coupling phase constant. Hence:

$$\Delta B=\frac{uB_0\beta_c}{\omega} \quad (8)$$

The length L of the waveguide can be shown to be:

$$L=\frac{\pi}{\sqrt{2}\beta_c}=\pi D\sqrt{\frac{4V_0}{I_0Z_0}} \quad (9)$$

It should be pointed out that the couplers of FIGS. 2 and 5 need not necessarily be waveguides. The principles of this invention can be applied by one skilled in the art to various forms of slow wave circuits as well. The length L and the increment of magnetic field $\Delta B$ are given in terms of the coupling phase constant $\beta_c$ which can be readily determined when different forms of coupling circuits are used. Further, various other methods may be employed for changing the magnetic field within the beam in accordance with the above specifications; for example, flux guides could be used; a focusing magnet of varying diameter could be used.

Implicit in the use of distributed circuit input and output couplers is the employment of a distributed circuit pump coupler; if the input signal wave is of some finite phase velocity, the pump wave must also have a corresponding finite velocity. Another requirement, however, is that the traveling pump wave must produce quadrupole electric fields throughout the beam in order to amplify the fast cyclotron wave. The term quadrupole fields is used herein to denote the $n=2$ waveguide mode wherein the fields produced in the beam by the wave have an azimuthal periodicity of 2.

Figure 7:
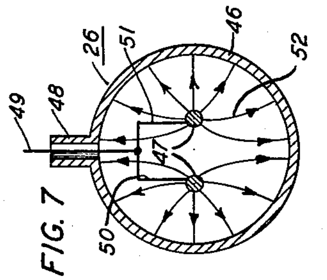
FIG. 7 is an end view of the pump coupler of the device of FIG. 1.

These requirements are met by pump coupler 26 of FIG. 1. The structure of pump coupler 26 can be better understood with reference to FIG. 7 which is a view taken along lines 7—7 of FIG. 1. Pump coupler 26 comprises a conductive outer cylinder 46 and two parallel conductive rods 47. The pump wave is introduced to the coupler by means of a conventional coaxial cable comprising the outer conductor 48 and an inner conductor 49. The outer conductor 48 is conductively connected to cylinder 46 while the inner conductor 49 is connected by means of branches 50 and 51 to the parallel rods 47. Branches 50 and 51 are of precisely the same length so that there is no phase difference between the currents on the two parallel rods. The electric field configuration illustrated by lines 52 are those which are produced at an instant at which the inner conductor 49 and parallel rods 46 are positive with respect to outer conductor 48 and cylinder 46. It can be seen that traveling quadrupole electric fields are produced within the electron beam.

Figure 8:
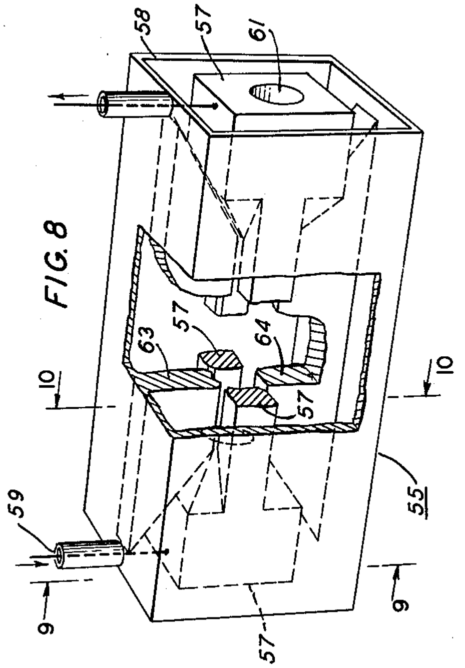
FIG. 8 is a perspective view of a pump coupler which could alternatively be used in the device of FIG. 1.

In certain instances, it may be difficult to launch a traveling pump wave in coupler 29, primarily because of the stringent requirement that branches 50 and 51 be of the same length. An alternative form of pump coupler is shown in FIG. 8. Coupler 55 of FIG. 8 comprises an inner conductor 57 and an outer conductor 58. The outer conductor of the input coaxial cable 59 is connected to the outer conductor 58 and the inner conductor of the caaxial cable is connected to iner conductor 57. An aperture 61 through the center of the inner conductor 57 permits the passage of the electron beam. Two ridges, 63 and 64 of the outer conductor 58 taper inwardly and part of inner conductor 57 is cut away to receive these ridges.

Figure 9:
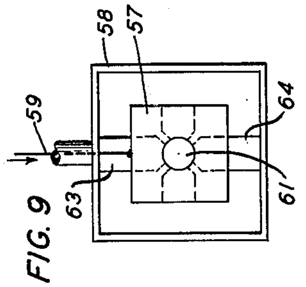
FIG. 9 is a view taken along line 9—9 of FIG. 8.
Figure 10:
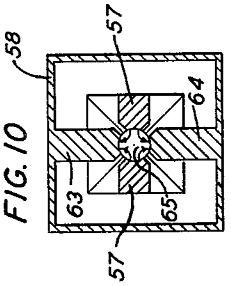
FIG. 10 is a view taken along line 10—10 of FIG. 8.

As seen in FIG. 9, the input end of coupler 59 is in the form of a coaxial transmission line. Because of this, the pump wave is easily launched into the coupler. The top and bottom portions of inner conductor 57 are gradually cut away so that in the middle portion of coupler 55 the inner conductor 57 is in the form of two parallel rods as shown in FIG. 10. FIG. 10 also shows that at the middle portion of coupler 55, ridges 63 and 64 and inner conductor 57 are equidistant from the beam. This being the case, quadrupole electric fields are concentrated within the beam as shown by electric field lines 65. The output end of coupler 55 is identical with the input end so that residual pump energy is removed at a point at which the coupler is in the form of a balanced coaxial transmission line.

The embodiment of FIG. 8 offers two important advantages: the pump wave is launched onto, and removed from, a coaxial transmission line so that the possibility of phase distortion is minimized; the ridges 63 and 64 of outer conductor 58 are in close proximity to the beam so that the quadrupole fields are concentrated within the beam. Ridges 63 and 64 and inner conductor 57 are tapered to prevent reflection or distortion of the traveling pump wave. In some cases it may be desirable to make this transition by periodically and abruptly changing the width of the ridges and the width of the inner conductor in accordance with the well known principles of the stepped wave guide transformer.

It is intended that the above described devices be merely illustrative of the utility of the inventive concepts involved. Various other arrangements may be devised by those skilled in the art without departing from the spirit and scope of my invention.

What is claimed is:

1. An electron discharge device comprising: means for forming and projecting a beam of electrons along a path; means for producing a magnetic field which is substantially parallel with said path thereby focusing said beam and establishing inherent slow and fast cyclotron modes of wave propagation within said beam; a distributed circuit input coupler for propagating a first traveling wave in coupling relationship to the fast cyclotron mode of said beam; means at the upstream end of said input coupler for increasing the flux density of said magnetic field within said beam; means at the downstream end of said input coupler for decreasing the magnetic flux density within said beam; means for parametrically amplifying the energy of said first traveling wave comprising a distributed circuit pump coupler for propagating a second traveling wave in the $n=2$ mode and in coupling relationship to the fast cyclotron mode of said beam; a distributed circuit output coupler for extracting fast cyclotron wave energy from said beam; means at the upstream end of said output coupler for increasing the magnetic flux density within said beam; and means at the downstream end of said coupler for decreasing the magnetic flux density within said beam.

2. A parametric amplifier comprising: means for forming and projecting a beam of electrons; means for producing a magnetic flux density throughout said beam thereby focusing said beam and establishing inherent slow and fast cyclotron modes within said beam; distributed circuit input means for propagating a first traveling wave in coupling relationship with the fast cyclotron mode of said beam; distributed circuit parametric pumping means for propagating a second traveling wave in coupling relationship with the fast cyclotron mode of said beam; said pumping means comprising two conductive rods, each parallel to said beam, and a conductive cylinder which surrounds said rods; distributed circuit output means for extracting fast cyclotron wave energy from said beam; means for increasing the magnetic flux density at one end of said input means and for decreasing the magnetic flux density at the other end of said input means; and means for increasing the magnetic flux density at one end of said output means and for decreasing the magnetic flux density at the other end of said output means.

3. An electron discharge device comprising: means for forming and projecting an electron beam; a distributed circuit input coupler for propagating a first traveling wave in coupling relationship with said beam at a faster phase velocity than the mean velocity of said beam; parametric amplification means comprising a distributed circuit pump coupler for propagating a second traveling wave in coupling relationship to said beam at substantially the same velocity as said fast traveling wave; a distributed circuit output coupler for extracting energy from said beam; a magnet for producing a mean magnetic field within said beam forming means and said pump coupler; means for producing a first magnetic field at one end of said input coupler that is higher than said mean magnetic field; and means for producing a second magnetic field at the other end of said input coupler that is lower than said mean magnetic field.

4. The electron discharge device of claim 3 wherein said first magnetic field is substantially uniform and extends from said one end to substantially the midpoint of said coupler and wherein said second magnetic field is substantially uniform and extends from said other end to substantially said midpoint.

5. The electron discharge device of claim 4 wherein the length of said input coupler is substantially equal to $$\frac{\pi}{\sqrt{2}\,\beta_c}$$

where $\beta_c$ is the coupling phase constant of the coupler and the electron beam.

6. The electron discharge device of claim 5 wherein the flux density of the said first magnetic field is substantially equal to $$B_0+\frac{u\beta_0\beta_c}{\omega}$$

and the flux density of said second magnetic field is substantially equal to $$B_0-\frac{uB_0\beta_c}{\omega}$$

where $u$ is the mean beam velocity, $\beta_0$ is the flux density of said mean magnetic field and $\omega$ is the approximate frequency of said first traveling wave.

7. A parametric amplifier comprising: means for forming and projecting an electron beam; a source of signal wave energy; a source of pump wave energy; an input waveguide for propagating signal wave energy in proximity to said beam; means for parametrically amplifying said signal wave energy comprising a pump waveguide comprising an inner conductor and an outer conductor; means for coupling one end of said inner and outer conductors to said source of pump wave energy; the inner conductor having two end portions completely surrounding said beam and a middle portion bordering the beam on only two sides; two diametrically disposed ridges extending inwardly from said outer conductor; the middle portion of said inner conductor and the two ridges being substantially equidistant from said electron beam; and an output waveguide for extracting energy from said beam.

8. An electron discharge device comprising: means for projecting an electron beam through an input region, a pump region and an output region; distributed circuit means extending along said input region for causing components of a traveling signal wave that are transverse to said beam to modulate said beam; means for parametrically amplifying signal wave modulations of the electron beam comprising distributed circuit means extending along said pump region for transmitting a pump wave; distributed circuit means extending along said output region for extracting energy from said beam; and means for producing a magnetic field throughout said beam that has a first flux density at the upstream end of said input region, a second flux density at the midpoint of said input region and along said pump region, and a third flux density at the downstream end of said input region.

9. The electron discharge device of claim 8 wherein said first flux density is equal to $B_0+\Delta B$ and said third flux density is equal to $B_0-\Delta B$, where $B_0$ is said second flux density and $\Delta B$ is some increment of flux density.

10. The electron discharge device of claim 9 wherein said magnetic field tapers along substantially the entire length of the input region from $B_0+\Delta B$ to $B_0-\Delta B$.

11. A parametric amplifier comprising: means for forming and projecting an electron beam through an input region, a pump region and an output region; distributed circuit means comprising a pair of parallel plates for transmitting a signal wave along said input region at substantially the velocity of light; means for parametrically amplifying said signal wave comprising distributed circuit means for transmitting a pump wave along said pump region at substantially the velocity of light; distributed circuit means comprising a pair of parallel plates extending along said output region for extracting energy from said beam; means for producing a magnetic field throughout said beam; means for augmenting the magnetic field at one end of said input and output regions; and means for attenuating the magnetic field at the other end of said input and output means.

No references cited.